Patented Apr. 14, 1942

2,279,512

UNITED STATES PATENT OFFICE 2,279,512

MOLDING COMPOUND

Frank J. Groten and James H. Lower, Stamford, Conn., assignors to American Cyanamid Company, New York, N. Y., a corporation of Maine No Drawing. Application August 1, 1940, Serial No. 349,300

12 Claims. (Cl. 260—45)

This invention relates to an improvement in the new class of resinous molding compounds described in our copending application Serial No. 256,772, filed February 16, 1939, now Patent No. 2,229,291, dated January 21, 1941. The invention includes the improved molding resins themselves, their methods of preparation, and the molded products obtained therefrom.

In the above identified application we have described a class of molding compounds prepared from a new type of synthetic resin which is an aldehyde condensation product of the material obtained upon heating dicyandiamide with a phenol until substantial quantities of ammonia are given off and most of the dicyandiamide is converted into cyclic compounds. The molded products described in that application are prepared by mixing these heat-treated dicyandiamide-phenol resins with small quantities of an acidic curing agent, together with lubricants and fillers, and molding the resulting compound under heat and pressure for suitable periods of time.

Our present invention relates more particularly to an improvement in the steps of condensing the heat-treated dicyandiamide-phenol mixture with formaldehyde or other aldehyde and the subsequent preparation of molding compounds. In our prior application we pointed out that the formaldehyde should preferably be adjusted to a pH of 9.1–9.5 before condensing it with the heat-treated dicyandiamide-phenol mixture, in order to avoid gelation of the resin, but we stated that during the aldehyde condensation reaction a drop in the pH to 7.2–7.6 would be noted.

Further investigations have shown that this drop in pH during the formaldehyde condensation was due to the fact that we employed sodium hydroxide for neutralizing the formaldehyde. This material, like other free alkalies, has little or no buffering action and also causes the decomposition of formaldehyde to formic acid and methanol, which is the well-known Cannizzaro reaction. The formic acid produced by this reaction caused the rapid drop in pH that was noted during the formaldehyde condensation.

By replacing the sodium hydroxide with other alkalies having a buffering action we have succeeded in maintaining the pH at a constant value between about 9.1 and 9.5 throughout the formaldehyde condensation, and we have obtained a new type of resin having entirely different and unexpected properties. This resin can be mixed with fillers and lubricants and molded under heat and pressure, without the addition of any other catalyst or curing agent whatsoever, into objects having an even better surface appearance than those obtainable by using an acid catalyst, as described in our prior application. Moreover, the moldability of our new resins extends over a much wider range than is possessed by our earlier compounds, which means that either a rapid cure or a slower cure with better flow properties in the mold can be obtained at will. Since the molding compound contains no curing material other than the alkali its ageing properties are excellent and it can be stored for many months without impairing its molding properties.

We have found that the principles of our invention are equally applicable to the preparation of thermosetting resins from any of the grades of phenol described in our earlier application identified above. In other words, we have found that heat treated mixtures of dicyandiamide with synthetic phenol, 39.5° phenol, 82% phenol, and lower grades of phenols containing cresols, xylenols and the like, can be condensed with formaldehyde, acetaldehyde, benzaldehyde, furfural and other reactive aldehydes at a pH of about 9.1 to 9.5 to form resins, all of which are capable of being cured at ordinary molding temperatures of 150–175° F. or higher without the addition of catalysts or curing agents. The following is a description of the phenols which we have used in preparing our new resins:

(1) Synthetic phenol. This is the C. P. material and consists of practically 100% $C_6H_5OH$.

(2) 39.5° phenol. This is the highest grade of coal tar phenol obtainable. It contains between 99 and 99.5% $C_6H_5OH$.

(3) 82% phenol. This material consists of 82% $C_6H_5OH$, 8–14% meta and para-cresols and 4–10% o-cresol.

(4) "Barrett No. 8 Cresol." A representative sample of this material contains 0.25% o-cresol, 2.25% phenol, 73.5% of a mixture containing 60% meta and 40% para-cresol, 10.5% of a fraction consisting of 20% meta and para-cresols, 60% 1.2.4 xylenol and 20% 1.3.5 xylenol and known as the "x–1" fraction, and 13.5% of a fraction boiling between 204° C. and 210° C. Half of this fraction is meta and para-cresols and the other half is the "x–1" fraction having the composition indicated above.

(5) "Barrett Cresylic Acid (212° C.)." A representative sample of this material contains 10.8% phenol, 1.2% o-cresol, 20% meta and para-cresols, 20% "x–1" fraction, 20% 1.2.4 xylenol, 20% 1.3.5 xylenol and 8% of a higher fraction boiling between 230-250° C.

In practicing our invention the heat treated dicyandiamide-phenol mixture is prepared in the manner described in our above-identified application. The phenol, cresol or phenolic mixture of the type best suited to give the desired properties in the finished composition is placed in a jacketed kettle provided with an agitator and dicyandiamide is added. The charge is heated with stirring to the reflux temperature of the phenol, which is about 181-212° C. and maintained at these temperatures with agitation for about 2.5-5.5 hours. During this time ammonia is given off and is allowed to escape. The time of heating can be shortened to 1.5 hours if an acid condensing agent such as anhydrous zinc chloride is added in amounts of 0.5% of the weight of the dicyandiamide, as described in the copending application of J. T. Thurston et al, Serial No. 301,766, filed October 28, 1939.

The time of heating influences the properties of the finished product. We have found that upon continued heating as much as 0.2 mole of ammonia can be driven off for each mole of dicyandiamide charged, but in most cases a shorter heating period and correspondingly reduced ammonia evolution is recommended. Ordinarily the best results are obtained when from 0.13 to 0.18 mole of ammonia per mole of dicyandiamide are liberated, but we have obtained resins of good properties with much shorter heating periods and with the evolution of as little as 0.07-0.10 mole of ammonia per mole of dicyandiamide. It is sometimes desirable to carry out the refluxing in an atmosphere of an inert gas such as nitrogen or carbon dioxide in order to exclude oxygen.

The amounts of dicyandiamide to be heated with the phenol may vary between rather wide limits, depending on the characteristics desired in the finished product. Ordinarily equimolecular ratios of phenol and dicyandiamide are used, but where better heat resistance is desired it may be advisable to employ 2 or 3 moles of dicyandiamide for each mole of phenol.

After cooling the heat-treated material to below 100° C. the product is condensed with formaldehyde, acetaldehyde, benzaldehyde or other suitable aldehyde. The amount of aldehyde may vary from 2.7 to 5 moles for each mole of the phenol-dicyandiamide mixture. As has been stated, this aldehyde should first be mixed with sufficient amounts of an alkali having buffering properties to raise the pH to about 9.1-9.5 and preferably to about 9.3. Sodium and potassium carbonate are the best compounds that we have found for this purpose, but sodium silicate, sodium borate, and trisodium phosphate or their potassium equivalents may also be used. These or similar compounds may be added to the aldehyde as the dry solid or in solutions, using amounts sufficient to raise the pH to the desired figure. The condensation of the aldehyde containing these buffers with the heat-treated material is then carried out by heating the charge to refluxing temperatures which are about 96-98° C., and refluxing for about ½ hour or longer, depending on the purpose for which the resin is to be used. It will be noted that this is a much shorter time than is recommended for molding compounds when caustic soda is used as the alkali.

After refluxing the charge for the desired period of time it is dehydrated. This step is preferably carried out by applying a vacuum to the kettle such that most of the water can be removed at 72-76° C. Near the end point of the dehydration the temperature will rise to about 95-110° C., depending on the type of resin and time of reflux, and the charge is poured at this temperature after the last of the water has been evolved. It cools to a hard, brittle mass which will be clear if nitrogen was used as the inert gas in the kettle but slightly cloudy if carbon dioxide was used.

To prepare the molding compound, the resin is preferably finely ground (150-300 mesh). It is then thoroughly blended with a lubricant such as a mixture of calcium and zinc stearates, zinc oleate or the like. A filler such as wood flour, alpha-pulp, asbestos, diatomaceous earth, mica or similar material and a suitable amount of dyestuff are then added and the mixture is again blended. The material is compounded on differential rolls, one maintained at 100° C. and the other at 135° C., for 1.5 minutes when using a wood flour filler and 1 to 3 minutes with alpha-pulp filler and the resulting sheets are then ground to a particle size suitable for molding which may be done with or without a preliminary pelleting.

An alternative process which may be employed in the preparation of impregnated sheets or in preparing molding compounds is to omit the vacuum dehydration leaving the resin in syrup form. This syrup may be soaked into absorbent paper sheets which are then dried and pressed out in a flat mold to make a laminated board. Similarly, the resin syrup may be poured directly onto a blended mixture of the filler, lubricant and dye in a Banbury mixer at temperatures of 60-90° C. and mixed until the filler is thoroughly coated. The mass may then be dried with or without vacuum under controlled conditions until substantially all the water is removed after which it may be ground if desired.

The invention will be illustrated in greater detail by the following specific examples. It should be understood, however, that these examples are given primarily for purposes of illustration, and that the invention in its broader aspects is not limited thereto.

*Example 1*

Equimolecular quantities of dicyandiamide and 39.5° phenol are heated and refluxed at atmospheric pressure for 4 hours. Shortly after the heating is begun an evolution of ammonia is noted and the refluxing is continued until about 0.10 to 0.18 mole, and preferably about 0.15 mole, of ammonia have been given off for each mole of dicyandiamide charged. The mixture is then cooled to below 100° C.

1.85 lbs. of anhydrous sodium carbonate were added to 119.2 lbs. of 37½% aqueous formaldehyde solution, which was then mixed with 75 lbs. of the cooled reaction mixture described above. The formaldehyde condensation was then carried out by refluxing the mixture at 96-98° C. for about 30 minutes. At the beginning of the reflux the pH of the mixture was 9.3, and the same value was also found when the condensation was completed. The condensation product was then dehydrated by heating under a 21 inch vacuum and the resin was cooled and ground to 150-300 mesh.

A molding compound was prepared by intimately mixing 400 parts of the ground resin, 216 parts of alpha pulp and 3 parts of calcium stearate or other suitable lubricant. The mixture was blended thoroughly and then compounded on steam-heated differential rolls at 100 and 135° C. for 0.75 to 2.5 minutes, depending on the flow desired. After grinding to suitable particle size, portions of the batch were molded into tumblers, using a steam-heated press at 150-160° C. The pieces were found to have a light cream color, excellent luster and surface appearance, and a complete lack of odor or taste.

One of the tumblers was broken into small pieces and a 10 gram sample was refluxed with 150 cc. of water for 30 minutes to extract any free phenol that might be present. The water was then drained off, cooled to room temperature, and bromine water was added drop by drop to a 5 cc. sample until it was saturated as indicated by a yellow color. No precipitate was formed, indicating a complete absence of free phenol in the molded resin as this test is very sensitive.

Example 2

23.6 parts by weight of dicyandiamide and 26.4 parts of 82% phenol are heated and refluxed at atmospheric pressure with continuous agitation for 4 hours. Shortly after the heating is begun an evolution of ammonia is noted, and the refluxing is continued until about 0.15 mole of ammonia have been given off for each mole of dicyandiamide charged. The mixture is then cooled to below 100° C.

60.8 parts of 37.5% formaldehyde solution are neutralized by the addition of sodium carbonate to a pH of 9.1. This solution is then added to the cooled reaction mixture and the formaldehyde condensation is carried out with refluxing at 96-98° C. for about ½ hour. The condensation product is dehydrated by heating under a 21 inch vacuum until all the water is removed and the resin, upon cooling, is hard and brittle. The resin is then cooled to room temperatures and ground to 150-300 mesh.

A molding compound is prepared by intimately mixing 400 parts of the resin, 400 parts of wood flour and 4 parts of calcium stearate with suitable amount of dyestuff to give the required color. The mixture is blended thoroughly and then compounded on steam-heated differential rolls at 100-110° C. for 0.75 to 2.5 minutes, depending on the flow desired. The material may then be ground to suitable particle size and pelleted if desired.

Example 3

31.6 parts by weight of "Barrett No. 8 Cresol" and 23.6 parts of dicyandiamide are heat-treated as in Example 1. The resulting mixture is condensed with 60.8 parts of 37.5% formaldehyde solution which was neutralized with potassium carbonate to a pH of 9.5, dehydrated under a vacuum, cooled and ground. 400 parts of the resulting resin are mixed with 400 parts of wood flour, or suitable amounts of diatomaceous earth or other filler together with a lubricant. The resulting molding compound is well suited for a large variety of purposes, since it can be molded to pieces which are fairly light in color and possess good dielectric strength, excellent arc resistance and retain their dimensions under the most extreme conditions of humidity.

Example 4

27 parts of "Barrett Cresylic Acid (212° C.)" and 18.5 parts of dicyandiamide are heat-treated as in Example 1 until about 0.13 mole of ammonia are evolved for each mole of dicyandiamide. The product is condensed with 46 parts of 37.5% formaldehyde solution neutralized with borax to a pH of 9.4 after which the resulting resin is dehydrated under a vacuum, cooled and ground to 150-300 mesh or finer.

400 parts of the ground resin are mixed with an equal weight of wood flour or suitable amounts of other fillers such as mica, diatomaceous earth, cotton flock, etc., together with a lubricant such as calcium stearate. The resulting powder can be cured in 1 minute under ordinary molding conditions and is therefore a good general purpose molding compound for producing any type of molded article in which the lightest color is not required. It is particularly valuable for its good electrical properties and moisture resistance.

This is a continuation-in-part of our copending application, Serial No. 256,772, filed February 16, 1939, now Patent No. 2,229,291, dated January 21, 1941.

We claim:

1. A method of preparing a thermosetting resin capable of being cured without further addition of catalyst which comprises condensing with an aldehyde the material obtained upon heating dicyandiamide and a phenol until from 0.07 to 0.18 mole of ammonia per mole of dicyandiamide are evolved while maintaining the pH at a relatively constant value between about 9.1 and 9.5 throughout the aldehyde condensation.

2. A method of preparing a thermosetting resin capable of being cured without further addition of catalyst which comprises condensing with an aldehyde the material obtained upon heating dicyandiamide and a phenolic mixture containing an alkyl phenol until from .07 to 0.18 mole of ammonia per mole of dicyandiamide are evolved while maintaining the pH at a relatively constant value between about 9.1 and 9.5 throughout the aldehyde condensation.

3. A method of preparing a thermosetting resin capable of being cured without further addition of catalyst which comprises condensing with an aldehyde the material obtained upon heating dicyandiamide and a cresol until from .07 to 0.18 mole of ammonia per mole of dicyandiamide are evolved while maintaining the pH at a relatively constant value between about 9.1 and 9.5 throughout the aldehyde condensation.

4. A method of preparing a thermosetting resin capable of being cured without further addition of catalyst which comprises condensing with an aldehyde the material obtained upon heating dicyandiamide and 82% phenol until from 0.13 to 0.18 mole of ammonia per mole of dicyandiamide are evolved while maintaining the pH at a relatively constant value between about 9.1 and 9.5 throughout the aldehyde condensation.

5. A synthetic resin of the thermosetting type capable of being cured without further addition of catalyst, said resin being the condensation product of an aldehyde with the material obtained upon heating a mixture of dicyandiamide and a phenol until from .07 to 0.18 mole of ammonia per mole of dicyandiamide are evolved while maintaining the pH at a relatively constant value between about 9.1 and 9.5 throughout the aldehyde condensation.

6. A synthetic resin of the thermosetting type capable of being cured without further addition of catalyst, said resin being the condensation product of an aldehyde with the material obtained upon heating a mixture of dicyandiamide and a phenolic mixture containing an alkyl phenol until from .07 to 0.18 mole of ammonia per mole of dicyandiamide are evolved while maintaining the pH at a relatively constant value between about 9.1 and 9.5 throughout the aldehyde condensation.

7. A synthetic resin of the thermosetting type capable of being cured without further addition of catalyst, said resin being the condensation product of an aldehyde with the material obtained upon heating a mixture of dicyandiamide and a cresol until from .07 to 0.18 mole of ammonia per mole of dicyandiamide are evolved while maintaining the pH at a relatively constant value between about 9.1 and 9.5 throughout the aldehyde condensation.

8. A synthetic resin of the thermosetting type capable of being cured without further addition of catalyst, said resin being the condensation product of an aldehyde with the material obtained upon heating a mixture of dicyandiamide and 82% phenol until from .07 to 0.18 mole of ammonia per mole of dicyandiamide are evolved while maintaining the pH at a relatively constant value between about 9.1 and 9.5 throughout the aldehyde condensation.

9. A molding composition comprising a filler and a synthetic resin of the thermosetting type capable of being cured without further addition of catalyst, said resin being the condensation product of an aldehyde with the material obtained upon heating a mixture of dicyandiamide and a phenol until from .07 to 0.18 mole of ammonia per mole of dicyandiamide are evolved while maintaining the pH at a relatively constant value between about 9.1 and 9.5 throughout the aldehyde condensation.

10. A molding composition comprising a filler and a synthetic resin of the thermosetting type capable of being cured without further addition of catalyst, said resin being the condensation product of an aldehyde with the material obtained upon heating a mixture of dicyandiamide and a phenolic mixture containing an alkyl phenol until from .07 to 0.18 mole of ammonia per mole of dicyandiamide are evolved while maintaining the pH at a relatively constant value between about 9.1 and 9.5 throughout the aldehyde condensation.

11. A molding composition comprising a filler and a synthetic resin of the thermosetting type capable of being cured without further addition of catalyst, said resin being the condensation product of an aldehyde with the material obtained upon heating a mixture of dicyandiamide and a cresol until from .07 to 0.18 mole of ammonia per mole of dicyandiamide are evolved while maintaining the pH at a relatively constant value between about 9.1 and 9.5 throughout the aldehyde condensation.

12. A molding composition comprising a filler and a synthetic resin of the thermosetting type capable of being cured without further addition of catalyst, said resin being the condensation product of an aldehyde with the material obtained upon heating a mixture of dicyandiamide and 82% phenol until from .07 to 0.18 mole of ammonia per mole of dicyandiamide are evolved while maintaining the pH at a relatively constant value between about 9.1 and 9.5 throughout the aldehyde condensation.

FRANK J. GROTEN.
JAMES H. LOWER.